US011926514B1

(12) United States Patent
O'Keeffe et al.

(10) Patent No.: US 11,926,514 B1
(45) Date of Patent: Mar. 12, 2024

(54) FORKLIFT

(71) Applicant: Palfinger AG, Bergheim bei Salzburg (AT)

(72) Inventors: Eric O'Keeffe, Monaghan (IE); Manuel Schwaighofer, Henndorf am Wallersee (AT)

(73) Assignee: PALFINGER AG, Bergheim bei Salzburg (AT)

( * ) Notice: Subject to any disclaimer, the term of this patent is extended or adjusted under 35 U.S.C. 154(b) by 0 days.

(21) Appl. No.: 18/233,621

(22) Filed: Aug. 14, 2023

(30) Foreign Application Priority Data

Aug. 16, 2022 (EP) .................................... 22190535

(51) Int. Cl.
*B66F 9/08* (2006.01)
*B66F 9/12* (2006.01)

(52) U.S. Cl.
CPC .............. *B66F 9/082* (2013.01); *B66F 9/125* (2013.01)

(58) Field of Classification Search
CPC .. B66F 9/08; B66F 9/082; B66F 9/125; B66F 9/22; B66F 9/16
See application file for complete search history.

(56) References Cited

U.S. PATENT DOCUMENTS 4,084,715 A * 4/1978 Stedman .................. B66F 9/08 187/229
4,217,074 A * 8/1980 Leasor .................... B66F 9/195 414/661
8,157,500 B1 * 4/2012 Husmann .............. B66F 9/0755 414/642
10,112,815 B2 * 10/2018 Litwiller .............. A01D 87/122
2003/0206793 A1 * 11/2003 Retzlaff ..................... B66F 9/24 414/636
2005/0102081 A1 * 5/2005 Patterson .............. B66F 17/003 701/50
2009/0312875 A1 * 12/2009 Lehtonen .................. B66F 9/08 700/280
2016/0101970 A1 * 4/2016 Taki ...................... B66F 17/003 701/50
2018/0155169 A1 * 6/2018 Tanaka ................. G05D 1/0225
2021/0070593 A1 * 3/2021 Okumura .................. B66F 9/24
2022/0002126 A1 * 1/2022 Pappi .................. B66F 9/07572
2023/0072784 A1 * 3/2023 Song ......................... B66F 9/22

FOREIGN PATENT DOCUMENTS

JP 60-47799 3/1985
JP 2010-30771 2/2010
KR 10-2297032 9/2021

* cited by examiner

*Primary Examiner* — Kaitlin S Joerger
(74) *Attorney, Agent, or Firm* — Wenderoth, Lind & Ponack, L.L.P.

(57) ABSTRACT

A forklift includes a chassis, a mast hydraulically tiltable relative to the chassis in a primary tilting motion, a fork carriage for mounting forks for supporting a load, the fork carriage being hydraulically tiltable relative to the mast in a secondary tilting motion, and a hydraulic system having an operating element for a user to control the primary tilting motion and the secondary tilting motion. The hydraulic system is configured to carry out a hydraulic sequence control of the primary tilting motion and the secondary tilting motion.

17 Claims, 11 Drawing Sheets

FORKLIFT

BACKGROUND OF THE INVENTION

The invention concerns a forklift. Forklifts of the general kind, used for picking up, transporting, stacking and unstacking loads, may comprise a chassis and a mast with a fork carriage. The chassis may comprise the driver's cabin, a drive system and a prime mover of the forklift. The mast may be tiltable relative to the chassis in a primary tilting motion between a substantially upright position and at least one inclined position, wherein the inclined position may be a position in which the mast is tilted towards the chassis and may therefore be suited for securing a load when picking it up.

The fork carriage is generally a support structure where the forks attach or mount. The fork carriage may be tiltable relative to the mast in a secondary tilting motion between a position in which the fork carriage is substantially aligned with the mast and at least one position in which the fork carriage is inclined relative to the mast. The inclined position may be a position in which the fork carriage is tilted towards the chassis and may therefore be suited for securing a load in a similar manner when picking it up. The substantially upright position of the mast and the position of the fork carriage in which it is substantially aligned to the mast may be particularly suited for engaging or setting down a load. The forklift may further comprise a hydraulic system having at least one operating element for a user to control the primary tilting motion and the secondary tilting motion.

Forklifts known in the art may comprise several operating elements which may be operated by a user to control various functions of the hydraulic system, in particular several operating elements for tilting the mast relative to the chassis in the primary tilting motion and also for tilting the fork carriage relative to the mast in the secondary tilting motion. The primary tilting motion and the secondary tilting motion may generally be controlled by a user independent from each other through separate operating elements, for example separate levers. Picking up and setting down loads requires a coordinated control of the primary and secondary tilting motion through actuation of the designated operating elements by the user, a task which requires extensive training and demands both attention and focus from the user and may therefore be tiring and prone to error.

SUMMARY OF THE INVENTION

The purpose of the invention is to provide an improved forklift which, in particular, provides improved operability and is less prone to error. In particular a further advantage of the invention is a hydraulic system of reduced complexity.

A forklift according to the invention may be used for picking up, transporting, stacking, and unstacking loads and may generally comprise a chassis and a mast with a fork carriage that may be raised and lowered by the mast. The chassis may comprise the driver's cabin, a drive system, a prime mover of the forklift and preferably a counterweight. Operating elements for controlling various functions of the forklift and in particular the functions of the hydraulic system may be arranged in the driver's cabin.

The mast, which may act as a vertical support that raises and lowers the load, is hydraulically tiltable relative to the chassis in a primary tilting motion at least between a substantially upright position—often referred to as the home position—and at least one inclined position—often referred to as a position in which the mast is tilted back. The inclined position may be a position in which the mast is tilted towards the chassis and may therefore be suited for securing a load when picking it up. The mast may be tiltable by a hydraulically generated force acting between the chassis and the mast.

The substantially upright position may be a position in which the mast is in a substantially vertical position when the forklift is operated on a substantially horizontal ground.

In some embodiments of the forklift, the primary tilting motion may allow for the mast to be further tilted away from the chassis past a substantially upright position. In such an instance, a primary actuator of the primary tilting motion may not have reached a substantially fully extended state in the substantially upright position of the mast. The hydraulic system of such an embodiment may be configured to carry out a hydraulic sequence control that returns the mast from a position in which it is inclined towards the chassis to the substantially upright position, for instance by using appropriate position sensors or position switches. An analogous configuration may be provided for the secondary tilt system.

The fork carriage, which may be mounted to the mast, is generally a support structure where the forks which support a load attach or mount. The fork carriage is hydraulically tiltable relative to the mast in a secondary tilting motion at least between a position in which the fork carriage is substantially aligned with the mast—often referred to the home position or a position in which forks attached to the fork carriage are perpendicular to the mast—and at least one position in which the fork carriage is inclined relative to the mast. The inclined position may be a position in which the forks are inclined relative to the mast—often referred to as a position in which the fork carriage or the forks is or are tilted back. The fork carriage may be tiltable by a hydraulic force acting between the fork carriage at the mast. The fork carriage may comprise forks to support a load.

With the mast in a substantially upright position, the forks may be inclined relative to the mast so that they are effectively inclined towards the chassis and may therefore be suited for securing a load.

The substantially upright position of the mast and the position of the fork carriage in which it is substantially aligned to the mast may be particularly suited for engaging or setting down a load.

The mast may generally be limited to be tiltable over a range of positions from a substantially upright position to a maximally inclined position.

The fork carriage may generally be limited to be tiltable over a range of positions from a position in which the fork carriage is substantially aligned with the mast to a maximally inclined position.

The forklift further comprises a hydraulic system having at least one operating element for a user to control the primary tilting motion and the secondary tilting motion. The operating element may for instance act upon the hydraulic control valve which controls the primary and secondary hydraulic tilting motion.

The hydraulic system of a forklift according to the invention is configured to carry out a hydraulic sequence control of the primary tilting motion and the secondary tilting motion.

In the case of picking up a load, where both the mast and the fork carriage may generally respectively be in a substantially upright position and a position substantially aligned with the mast, upon actuation of one operating element, the secondary tilting motion from the position in which the fork carriage is substantially aligned with the mast to the at least one position in which the fork carriage is inclined relative to the mast is carried out before the primary tilting motion from the substantially upright to the at least one inclined position.

In the case of setting down a load, where both the mast and the fork carriage may generally be in an inclined position, upon actuation of one operating element, the secondary tilting motion from the at least one position in which the fork carriage is inclined relative to the mast to the position in which the fork carriage is substantially aligned with the mast is carried out before the primary tilting motion from the at least one inclined position to the substantially upright position. The primary tilting motion from the at least one inclined position to the substantially upright position is hydraulically locked until the fork carriage is substantially aligned with the mast.

The hydraulic lock of the primary tilting motion from the at least one inclined position to the substantially upright position may prevent carrying out the primary tilting motion until the fork carriage is substantially aligned with the mast by the secondary tilting motion.

This ensures that both the secondary tilting motion of the fork carriage and the primary tilting motion of the mast are carried out upon actuation of one operating element, and that the secondary tilting motion of the fork carriage is prioritized over the primary tilting motion of the mast.

The hydraulic sequence control may be implemented in a hybrid system comprising electronically switched valves and mechanically switched valves. Preferably, the hydraulic sequence control is completely implemented with mechanically switched valves.

In an advantageous embodiment, the hydraulic system comprises a single operating element for a user to control the primary tilting motion and the secondary tilting motion.

For picking up a load, where the secondary tilting motion is carried out from the position in which the fork carriage is substantially aligned with the mast to the at least one position in which the fork carriage is inclined relative to the mast before the primary tilting motion from the substantially upright to the at least one inclined position, the single operating element is moveable in a first direction.

For setting down a load, where the secondary tilting motion is carried out from the at least one position in which the fork carriage is inclined relative to the mast to the position in which the fork carriage is substantially aligned with the mast before the primary tilting motion from the at least one inclined position to the substantially upright position, the single operating element is moveable in a second direction.

In a preferred embodiment, the sequence of the primary tilting motion and the secondary tilting motion can be controlled by a single operating element for a user without requiring interaction with any further operating elements such as buttons or switches.

The single operating element for a user to control the primary tilting motion and the secondary tilting motion may be provided as a lever that is substantially linearly moveable between two positions.

The mast of the forklift may generally be tiltable relative to the chassis about a first pivot joint. The fork carriage may generally be tiltable relative to the chassis about a second pivot joint and may advantageously be mounted on the mast facing away from the chassis.

The second pivot joint for tilting the fork carriage may be closer, in particular in a substantially horizontal direction, to a load picked up by the forks, specifically a center of gravity of a load picked up by the forks, than the first pivot joint for tilting the mast.

For an unloaded forklift, the net force moment acting on the fork carriage due to the net weight of the fork carriage is intrinsically smaller than the net moment acting on the mast, which includes the net weight of the fork carriage and the net weight of the mast. The force moment may be expressed as the product of the weight of the fork carriage and/or mast in terms of the gravitational force acting on the fork carriage and/or mast and the distance from a reference point such as the center of gravity of the fork carriage and/or mast and the first or second pivot point.

For a loaded forklift, the force moment of a load, which is the product of the weight of a load in terms of the gravitational force acting on the load and the distance from a reference point such as the center of gravity of the load picked up by forks attached to the fork carriage and the first or second pivot point, acting on the fork carriage may therefore be smaller than the force moment acting on the mast.

The hydraulic system may thus be configured to carry out a hydraulic sequence control of the primary tilting motion and the secondary tilting motion based on the driving forces required to carry out the primary tilting motion and the secondary tilting motion. The motion that requires less driving force may preferably be prioritized.

In a further embodiment, the hydraulic system comprises at least one hydraulic fluid source for supplying pressurized hydraulic fluid, for instance a hydraulic pump, at least one primary hydraulic actuator for driving the primary tilting motion with pressurized hydraulic fluid and at least one secondary hydraulic actuator for driving the secondary tilting motion with pressurized hydraulic fluid. For driving the primary tilting motion and the secondary tilting motion, the at least one primary hydraulic actuator and the at least one secondary hydraulic actuator are advantageously simultaneously pressurizable with hydraulic fluid from the at least one hydraulic fluid source upon actuation of said one operating element. Preferably, the at least one primary hydraulic actuator and the at least one secondary hydraulic actuator may be simultaneously pressurizable with hydraulic fluid from the same hydraulic fluid source.

The fork carriage may comprise the secondary hydraulic actuator, which may act between the mast and the fork carriage. The mast may comprise the primary hydraulic actuator, which may be act between the mast and the chassis.

The force moment acting on the secondary hydraulic actuator may therefore be smaller than the force moment acting on the primary hydraulic actuator. Upon simultaneous pressurization of the at least one primary hydraulic actuator and the at least one secondary hydraulic actuator with hydraulic fluid from the at least one hydraulic fluid source, the smaller load moment acting on the secondary hydraulic actuator may therefore be overcome before the greater load moment acting on the primary hydraulic actuator is compensated or overcome. The secondary tilting motion may therefore be carried out before the primary tilting motion, either based on different force moments acting on the primary and secondary hydraulic actuators or based on the hydraulic lock preventing carrying out the primary tilting motion until the fork carriage is substantially aligned with the mast by the secondary tilting motion.

The hydraulic lock of the primary tilting motion from the at least one inclined position to the substantially upright position may be implemented by a hydraulic lock of the primary hydraulic actuator. A hydraulic lock may be implemented by a switching valve, a one-way check valve, a pressure relief valve, a pilot operated valve, an electronically switched valve or the like.

In a further embodiment, the hydraulic system comprises:

at least one hydraulic fluid source for supplying pressurized hydraulic fluid, for instance a hydraulic pump;

at least one primary hydraulic actuator for driving the primary tilting motion; and at least one secondary hydraulic actuator for driving the secondary tilting motion.

For picking up a load, the at least one primary hydraulic actuator and at least one secondary hydraulic actuator are connectable or connected in parallel, in particular in a freely fluid conducting manner, for simultaneous pressurization with hydraulic fluid for driving the primary tilting motion of the mast from the substantially upright position to at least one inclined position and the secondary tilting motion of the fork carriage from the position in which the fork carriage is substantially aligned with the mast to at least one position in which the fork carriage is inclined relative to the mast.

For setting down a load, the at least one primary hydraulic actuator and at least one secondary hydraulic actuator are connectable or connected in parallel, in particular in a freely fluid conducting manner, for simultaneous pressurization with hydraulic fluid for driving the primary tilting motion of the mast from an inclined position to the substantially upright position and the secondary tilting motion of the fork carriage from a position in which the fork carriage is inclined relative to the mast to the position in which the fork carriage is substantially aligned with the mast.

Upon simultaneous pressurization of the at least one primary hydraulic actuator and the at least one secondary hydraulic actuator with hydraulic fluid from the at least one hydraulic fluid source, the secondary tilting motion, for instance for picking up a load, may be carried out before the primary tilting motion, wherein the secondary tilting motion is carried out from the position in which the fork carriage is substantially aligned with the mast to at least one position in which the fork carriage is inclined relative to the mast, and the primary tilting motion is carried out from the substantially upright to the at least one inclined position.

Since, for instance, for setting down a load, the primary tilting motion from the at least one inclined position to the substantially upright position is hydraulically locked until the fork carriage is substantially aligned with the mast, upon simultaneous pressurization of the at least one primary hydraulic actuator and the at least one secondary hydraulic actuator with hydraulic fluid, the secondary tilting motion from the at least one position in which the fork carriage is inclined relative to the mast to the position in which the fork carriage is substantially aligned with the mast is carried out first.

The hydraulic system may further comprise:

a hydraulic fluid source for supplying pressurized hydraulic fluid, wherein the supply of pressurized hydraulic fluid can selectively be steered by a main control valve, the switching state of which may be controlled by way of the at least one operating element;

a primary tilt system which is configured to tilt the mast in the primary tilting motion, wherein the primary tilt system comprises a primary hydraulic actuator for driving the primary tilting motion, wherein the primary hydraulic actuator is a double acting hydraulic cylinder with a first chamber and a second chamber, wherein the primary tilting motion towards the at least one inclined position is driven by pressurizing the second chamber of the primary hydraulic actuator with hydraulic fluid and the primary tilting motion towards the substantially upright position is driven by pressurizing the first chamber of the primary hydraulic actuator with hydraulic fluid; and a secondary tilt system which is configured to tilt the fork carriage relative to the mast in the secondary tilting motion, wherein the secondary tilt system comprises a secondary hydraulic actuator for driving the secondary tilting motion, wherein the secondary hydraulic actuator is a double acting hydraulic cylinder with first chamber and second chamber, wherein the secondary tilting motion towards the position in which the fork carriage is inclined relative to the mast is driven by pressurizing the first chamber of the secondary hydraulic actuator with hydraulic fluid and the secondary tilting motion towards the at least one position in which the fork carriage is substantially aligned with the mast is driven by pressurizing the second chamber of the secondary hydraulic actuator with hydraulic fluid.

For a hydraulic sequence control of the primary tilting motion and the secondary tilting motion for picking up a load, the second chamber of the primary hydraulic actuator, which may be on the rod side, and the first chamber of the secondary hydraulic actuator, which may be on the bore side, may be connectable or connected in parallel with each other and a first output port of the main control valve in a fluid conducting manner for simultaneous pressurization with hydraulic fluid upon actuation of said one operating element.

For a hydraulic sequence control of the primary tilting motion and the secondary tilting motion for setting down a load, the first chamber of the primary hydraulic actuator, which may be on the bore side, and the second chamber of the secondary hydraulic actuator, which may be on the rod side, may be connectable or connected with each other and a second output port of the main control valve in a fluid conducting manner for simultaneous pressurization with hydraulic fluid upon actuation of said one operating element.

Discharge of hydraulic fluid from the second chamber of the primary hydraulic actuator, and therefore a primary tilting motion towards the substantially upright position of the mast, may be hydraulically locked by a pressure relief valve which enables discharge of hydraulic fluid from the second chamber of the primary hydraulic actuator above a predetermined or predeterminable hydraulic pressure in the second chamber of the primary hydraulic actuator. In a parallel connection of the first chamber of the primary hydraulic actuator and the second chamber of the secondary hydraulic actuator, the secondary hydraulic actuator may move the fork carriage into a position in which the fork carriage is substantially aligned with the mast while the primary hydraulic actuator remains hydraulically locked.

Upon reaching the position in which the fork carriage is substantially aligned with the mast, the secondary hydraulic actuator may reach an end stop, for instance through its limited range of travel and/or and end stop of the tilting motion of the fork carriage, and the pressure in the first chamber of the primary hydraulic actuator—and through force transmission in the hydraulic actuator also in the second chamber of the primary hydraulic actuator may consequently start to increase. Above a predetermined or predeterminable hydraulic pressure in the second chamber of the primary hydraulic actuator the primary tilting motion towards the substantially upright position of the mast may be carried out by enabling discharge of hydraulic fluid from the second chamber of the primary hydraulic actuator. Direct pressurization of the second chamber of the primary hydraulic actuator may be unaffected by the pressure relief valve, for instance by bypassing it with a none-way check valve, allowing pressurization but not discharge.

Discharge of hydraulic fluid from the second chamber of the primary hydraulic actuator may be hydraulically locked by a pressure relief valve. For the release of residual pressure in the second chamber of the primary hydraulic actuator, the pressure relief valve may be bypassed by a dedicated valve. Release of residual pressure in the second chamber of the primary hydraulic actuator may be of advantage when the forklift, provided in the form of a truck mountable forklift, is mounted to the back of truck by way of the fork. The weight of the forklift acting on the forks used for truck-mounting may otherwise lead to a pressure buildup in the primary hydraulic actuator.

In a primary tilting motion of the mast relative to the chassis in a direction of tilting the mast towards the at least one inclined position, a vertical position of the fork carriage relative to the chassis may preferably be elevated.

In a secondary tilting motion of the fork carriage relative to the mast in a direction of tilting the fork carriage towards the at least one position in which the fork carriage is inclined relative to the mast, a vertical position of the fork carriage relative to the mast may preferably be elevated.

In a preferred embodiment of the forklift, the fork carriage is mounted to the mast by a reach system, such as for example a pantograph reach system, and the fork carriage is displaceable in a substantially horizontal direction relative to the mast by the reach system. Such a reach system is often used when unloading a load from the far side of a truck or truck. The forklift may comprise a primary reach system for the mast and a secondary reach system for the fork carriage.

The at least on primary hydraulic actuator and the at least one secondary hydraulic tilt actuator may be connectable in parallel or disconnectable from a parallel connection in dependence of the substantially horizontal displacement of the fork carriage relative to the mast. A parallel connection of the primary hydraulic actuator and the secondary hydraulic actuator may be enabled or disabled depending on the substantially horizontal displacement of the fork carriage relative to the mast.

The at least one primary hydraulic actuator and the at least one secondary hydraulic actuator may be connectable in parallel or disconnectable from a parallel connection based on a switching state of a proximity switch and/or a signal from a position sensor.

A hydraulic valve in the hydraulic lines leading to and from the hydraulic actuators enabling or disabling a parallel connection may be directly or indirectly switched depending on the substantially horizontal displacement of the fork carriage relative to the mast.

Specifically, the at least one primary hydraulic actuator and the at least one secondary hydraulic actuator may be connectable in parallel in at least one reach position away from the substantially fully retracted position, preferably at least in the substantially fully extended reach position. Alternatively or in combination, the at least one primary hydraulic actuator and the at least one secondary hydraulic actuator may be disconnectable from a parallel connection in at least one reach position away from the substantially fully extended position, preferably at least in the substantially fully retracted reach position.

Enabling a parallel connection may be desired to carry out a hydraulic sequence control. Disabling or disconnecting a parallel connection, preferably temporarily, may be desired to disable the primary and/or secondary tilting motion, for instance after the fork carriage and/or the mast has been tilted into a state desired by the operator that should remain unchanged during further operation of the forklift.

Disabling the parallel connection may also be desired for operating the forklift without a load and/or a fully retracted secondary reach system.

The primary tilting motion may specifically be a motion in which the mast is tiltable in a direction towards and away from the chassis in a substantially vertical plane. The secondary tilting motion may specifically be a motion in which the fork carriage is tiltable in a direction towards and away from the mast in a substantially vertical plane.

In a preferred embodiment of the forklift, the mast is mounted to the chassis by way of a reach system, preferably a primary reach system, and the mast is displaceable in a substantially horizontal direction relative to the chassis by the reach system.

In a preferred embodiment of the forklift, the fork carriage is mounted to the mast with a side-shift system for laterally shifting the fork carriage relative to the mast, wherein the fork carriage is tiltable in the secondary tilting motion relative to the side-shift system.

BRIEF DESCRIPTION OF THE DRAWINGS

Embodiments of the invention are shown in the figures, wherein.

DETAILED DESCRIPTION OF THE INVENTION

Figure 1:
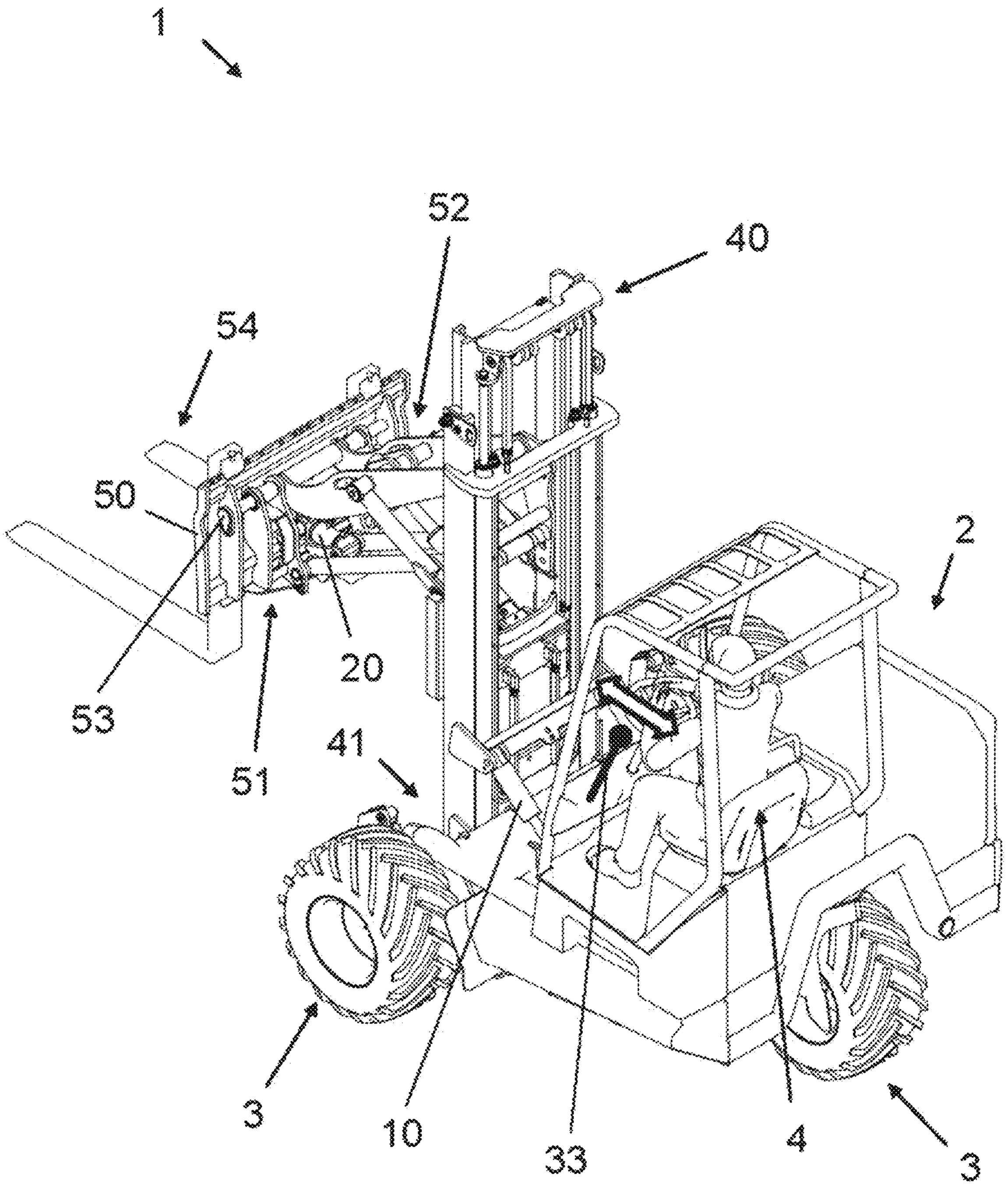
FIG. 1 shows a perspective view of a forklift.

FIG. 1 shows a forklift 1 comprising a chassis 2 with wheels 3 and a driver's cabin 4, a mast 40 which is hydraulically tiltable relative to the chassis 2 in a primary tilting motion at least between a substantially upright position and at least one inclined position (compare FIGS. 5*a* and 6*a*), a fork carriage 50 for mounting forks 54 for supporting a load 5, the fork carriage 50 being hydraulically tiltable relative to the mast 40 in a secondary tilting motion at least between a position in which the fork carriage 50 is substantially aligned with the mast 40 and at least one position in which the fork carriage 50 is inclined relative to the mast 40 (compare FIGS. 3*a* and 4*a*), and a hydraulic system having at least one operating element 33 for a user to control the primary tilting motion and the secondary tilting motion.

Figure 3A:
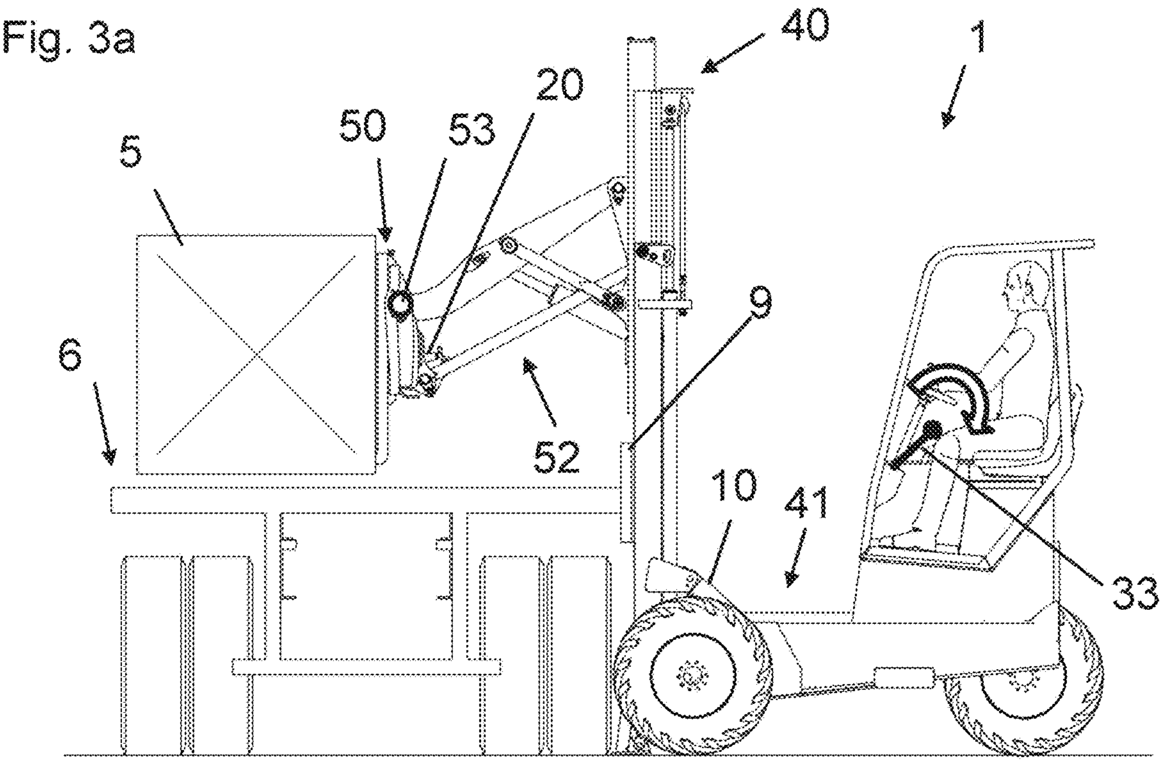
FIGS. 3*a* and 3*b* show a forklift with a picked up a load with a fully extended primary and secondary reach system and a corresponding schematic of a hydraulic system.
Figure 4A:
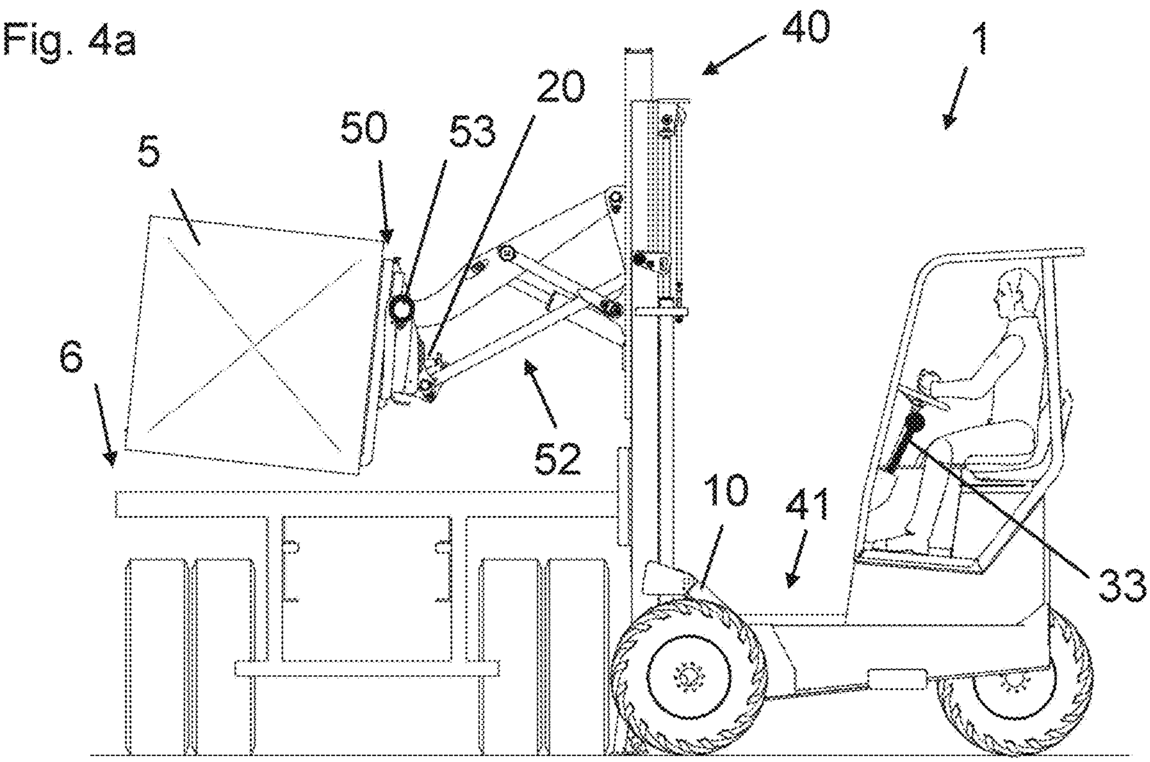
FIGS. 4*a* and 4*b* show a forklift with a tilted fork carriage and a corresponding schematic of a hydraulic system.
Figure 5A:
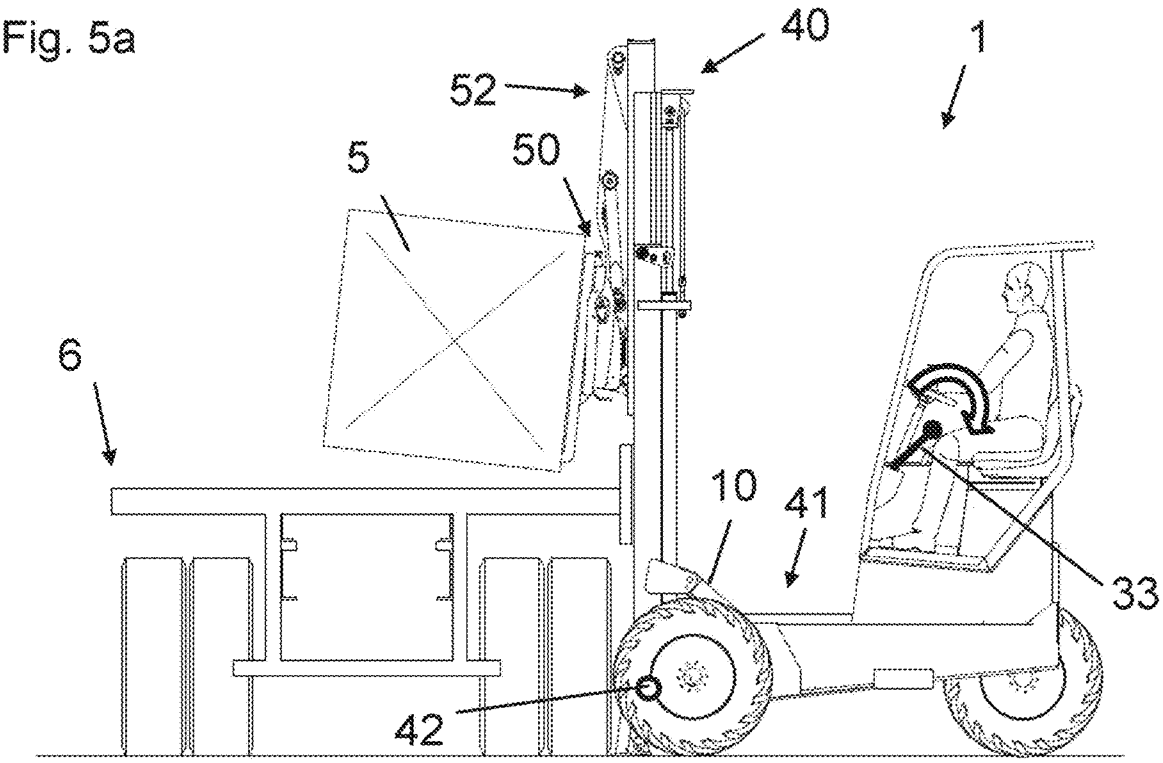
FIGS. 5*a* and 5*b* show a forklift with a retracted secondary reach system and a corresponding schematic of a hydraulic system.
Figure 6A:
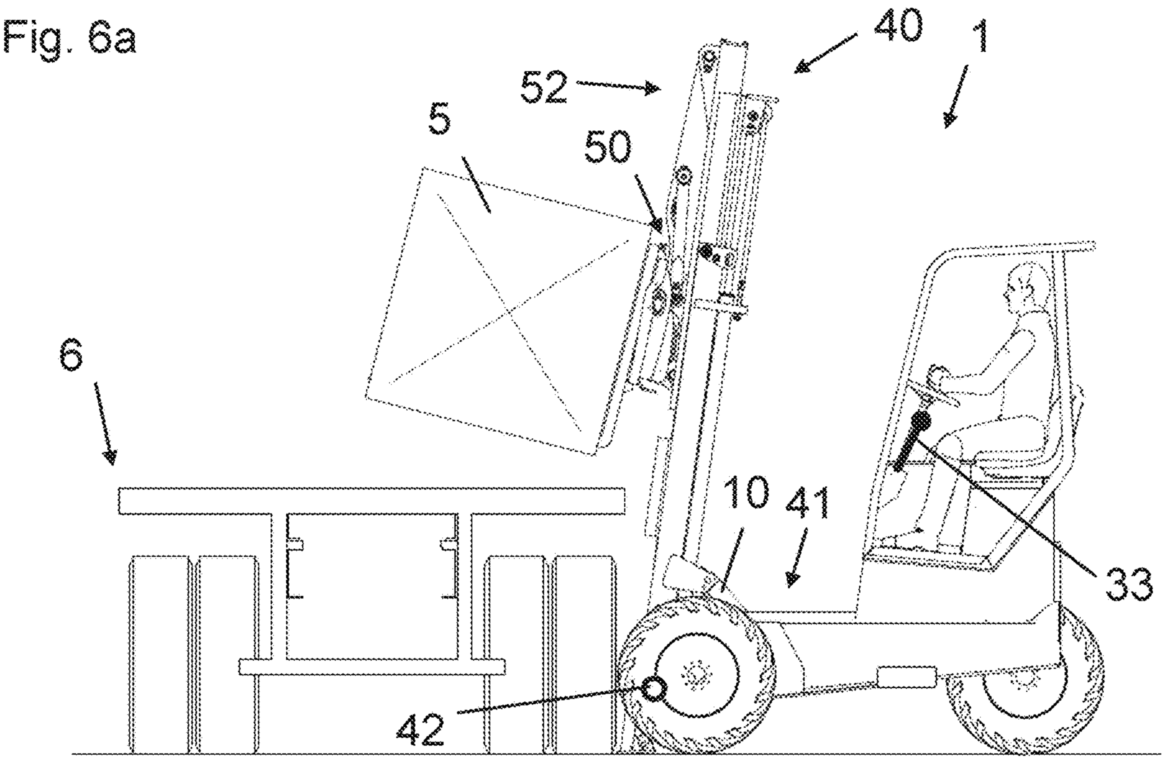
FIGS. 6*a* and 6*b* show a forklift with a tilted fork carriage and a tilted mast, and a corresponding schematic of a hydraulic system.

The mast 40 is hydraulically tiltable about a pivot point 42 schematically shown in FIGS. 5*a* and 6*a*, and the fork carriage 50 is hydraulically tiltable about a pivot point 53 schematically shown in FIGS. 1, 3*a* and 4*a*.

In this preferred embodiment, the hydraulic system comprises a single operating element 33 for a user to control the primary tilting motion and the secondary tilting motion.

The forklift 1 comprises a primary tilt system which is configured to tilt the mast 40 in the primary tilting motion, wherein the primary tilt system comprises a primary hydraulic actuator 10 for driving the primary tilting motion. Furthermore, the forklift 1 comprises a secondary tilt system which is configured to tilt the fork carriage 50 relative to the mast 40 in the secondary tilting motion, wherein the secondary tilt system comprises a secondary hydraulic actuator 20 for driving the secondary tilting motion.

Figure 7A:
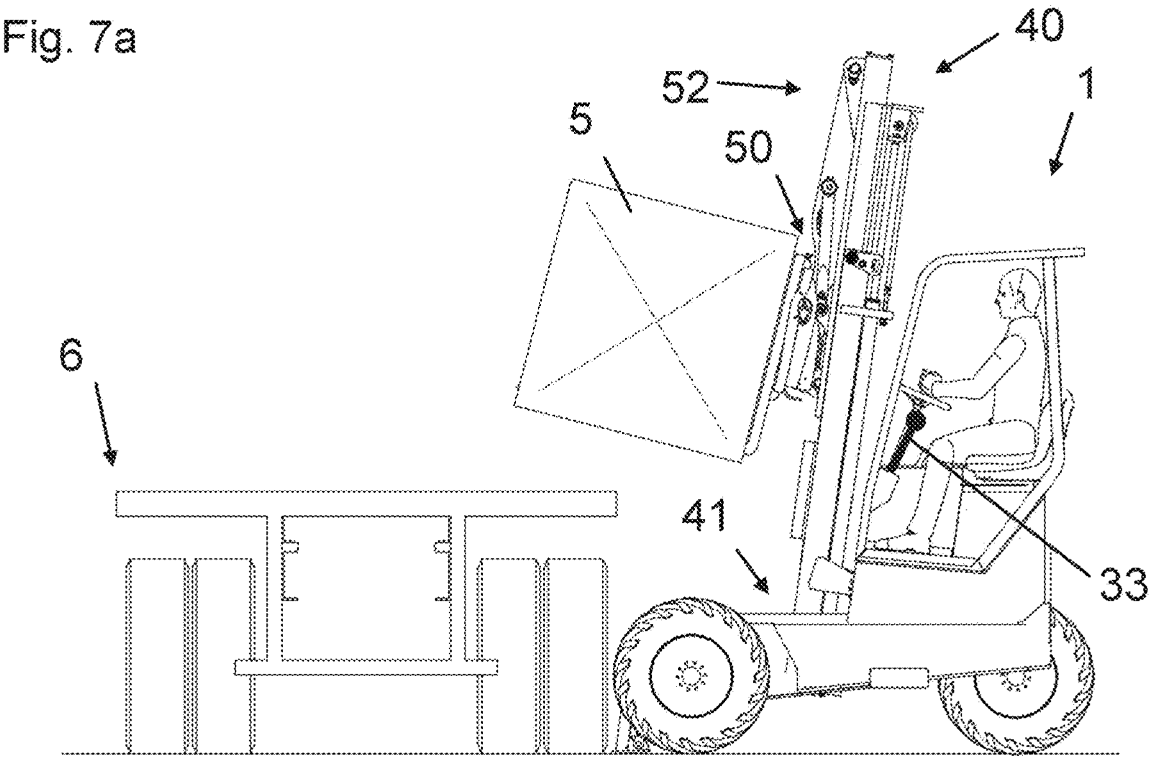
FIGS. 7*a* and 7*b* show a forklift with a retracted primary reach system and a corresponding schematic of a hydraulic system.
Figure 7B:
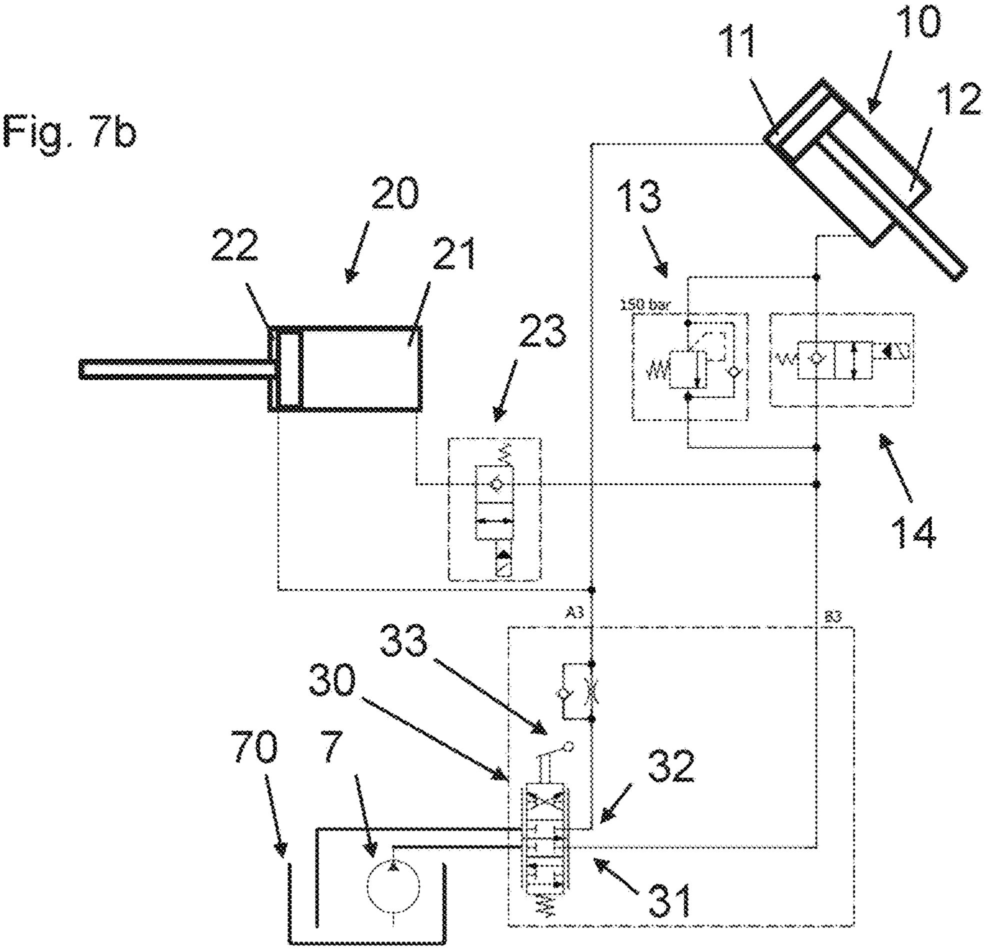

In this preferable embodiment, the mast 40 is mounted to the chassis 2 by way of a primary reach system 41, through which the mast 40 is displaceable in a substantially horizontal direction relative to the chassis 2 by the reach system 41 (compare FIGS. 6*a* and 7*a*).

Further thereto, the fork carriage 50 is mounted to the mast 40 by way of a secondary reach system 52, through which the fork carriage 50 is displaceable in a substantially horizontal direction relative to the mast 40 by the reach system 52 (compare FIGS. 4*a* and 5*a*).

As can be seen in FIG. 1, the fork carriage 50 is mounted to the mast 40 with a side-shift system 51 for laterally shifting the fork carriage 50 relative to the mast 40, wherein the fork carriage 50 is tiltable in the secondary tilting motion relative to the side-shift system 51.

Figure 2:
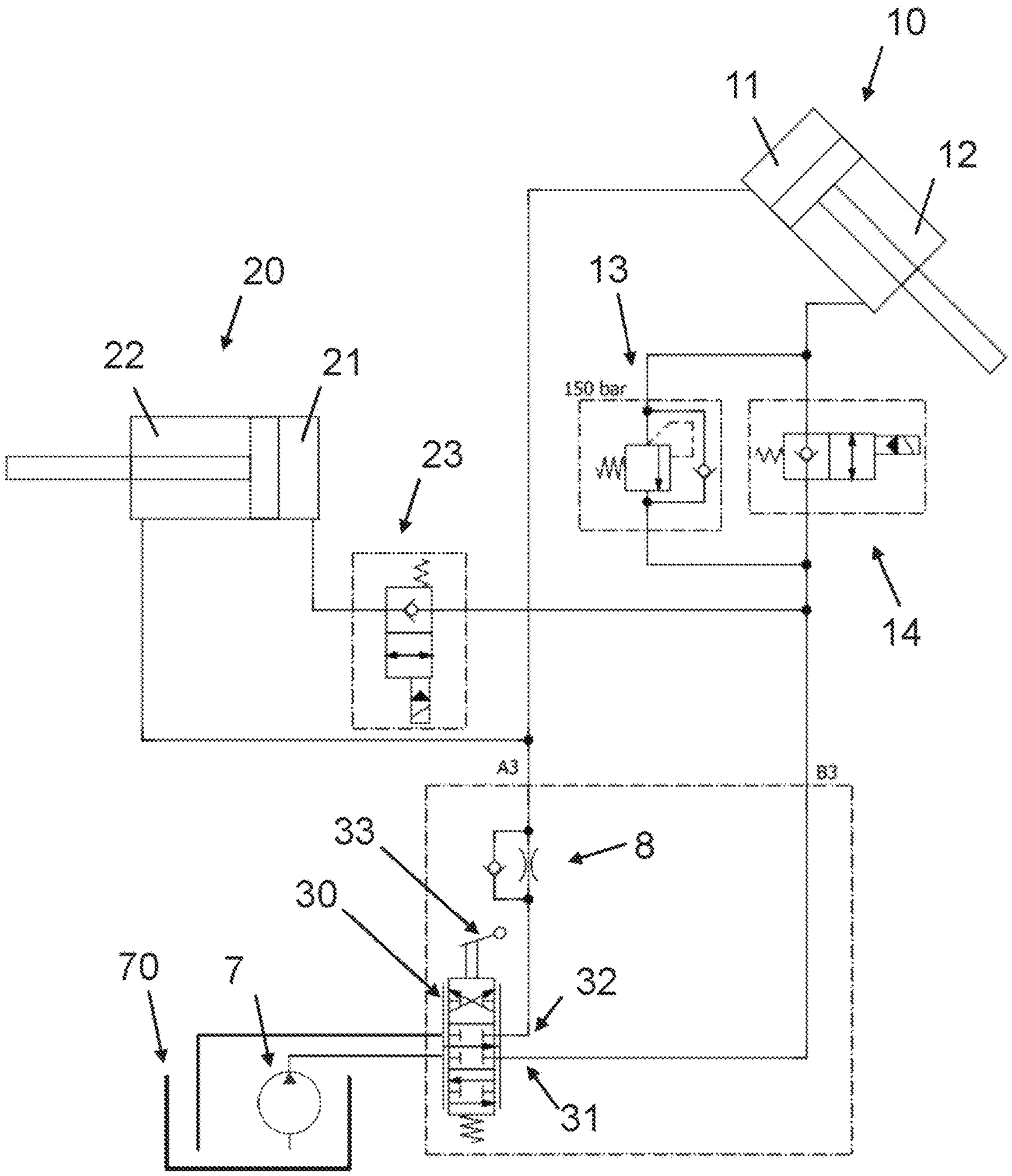
FIG. 2 schematically shows an embodiment of a hydraulic system.

FIG. 2 schematically shows an embodiment of the hydraulic system which comprises:

- a hydraulic fluid source 7, such as a hydraulic pump, for selectively supplying pressurized hydraulic fluid through a main control valve 30 with a selectable first output port 31 and a second output port 32, wherein the switching state of the main control valve can be controlled by way of the at least one operating element 33,
- a primary tilt system which is configured to tilt the mast 40 in the primary tilting motion, wherein the primary tilt system comprises a primary hydraulic actuator 10 for driving the primary tilting motion, wherein the primary hydraulic actuator 10 is a double acting hydraulic cylinder with a first chamber 11 and a second chamber 12, wherein the primary tilting motion towards the at least one inclined position (compare FIGS. 5*a* and 6*a*) is driven by pressurizing the second chamber 12 of the primary hydraulic actuator with hydraulic fluid and the primary tilting motion towards the substantially upright position (compare FIGS. 6*a* and 5*a*) is driven by pressurizing the first chamber 11 of the primary hydraulic actuator 10 with hydraulic fluid, and
- a secondary tilt system which is configured to tilt the fork carriage 50 relative to the mast 40 in the secondary tilting motion, wherein the secondary tilt system comprises a secondary hydraulic actuator 20 for driving the secondary tilting motion, wherein the secondary hydraulic actuator 20 is a double acting hydraulic cylinder with first chamber 21 and second chamber 22, wherein the secondary tilting motion towards the at least one position in which the fork carriage 50 is inclined relative to the mast 40 (compare FIGS. 3*a* and 4*a*) is driven by pressurizing the first chamber 21 of the secondary hydraulic actuator 20 with hydraulic fluid and the secondary tilting motion towards the position in which the fork carriage 50 is substantially aligned with the mast 40 (compare FIGS. 4*a* and 3*a*) is driven by pressurizing the second chamber 22 of the secondary hydraulic actuator 20 with hydraulic fluid.

A parallel connection, in particular a freely fluid conducting parallel connection, between the second chamber 12 of the primary hydraulic actuator 10 and the first chamber 21 of the secondary hydraulic actuator 20 can be enabled or disabled with a first solenoid valve 23 disposed between the first chamber 21 of the secondary hydraulic actuator 20 and the second chamber 12 of the primary hydraulic actuator 10. The first solenoid valve 23 may allow pressurization of the second chamber 12 of the primary hydraulic actuator 10 without pressurizing the first chamber 21 of the secondary hydraulic actuator 20. In the embodiment shown, the first solenoid valve 23 can be switched between a freely fluid conducting position and a one-way fluid conducting position.

Discharge of hydraulic fluid from the second chamber 12 of the primary hydraulic actuator 10 can be hydraulically locked by a pressure relief valve 13. For the release of residual pressure in the second chamber 12 of the primary hydraulic actuator 10, the pressure relief valve 13 can be bypassed by a second solenoid valve 14. Release of residual pressure in the second chamber 12 of the primary hydraulic actuator 10 may be of advantage when the forklift 1 is mounted to the back of truck with the forks 54, wherein the weight of the forklift 1 acting on the forks 54 used for truck-mounting may otherwise lead to a pressure buildup in the primary hydraulic actuator 10.

As shown in FIG. 2, the hydraulic system may further comprise a hydraulic throttle 8, optionally bypassed in one direction of flow, which may limit the flow of hydraulic fluid for smoothing of the primary tilting motion and/or the secondary tilting motion.

The various elements of the hydraulic system may be interconnected with each other by way of fluid-conducting hydraulic lines.

The hydraulic fluid source may supply pressurized hydraulic fluid from a tank 70 to various elements of the hydraulic system. Discharged hydraulic fluid may be returned to the tank 70.

As shown in FIG. 3*a*, when lifting a load 5 from the far side of the truck 6, both the primary and secondary reach systems 41, 52 are fully extended, and the truck support pads 9 rest against the side of the truck 6 to give the required stability to lift the load 5. However, once the truck pads 9 are against the truck 6, the primary tilt cannot be used as this would destabilize the forklift 1.

Figure 3B:
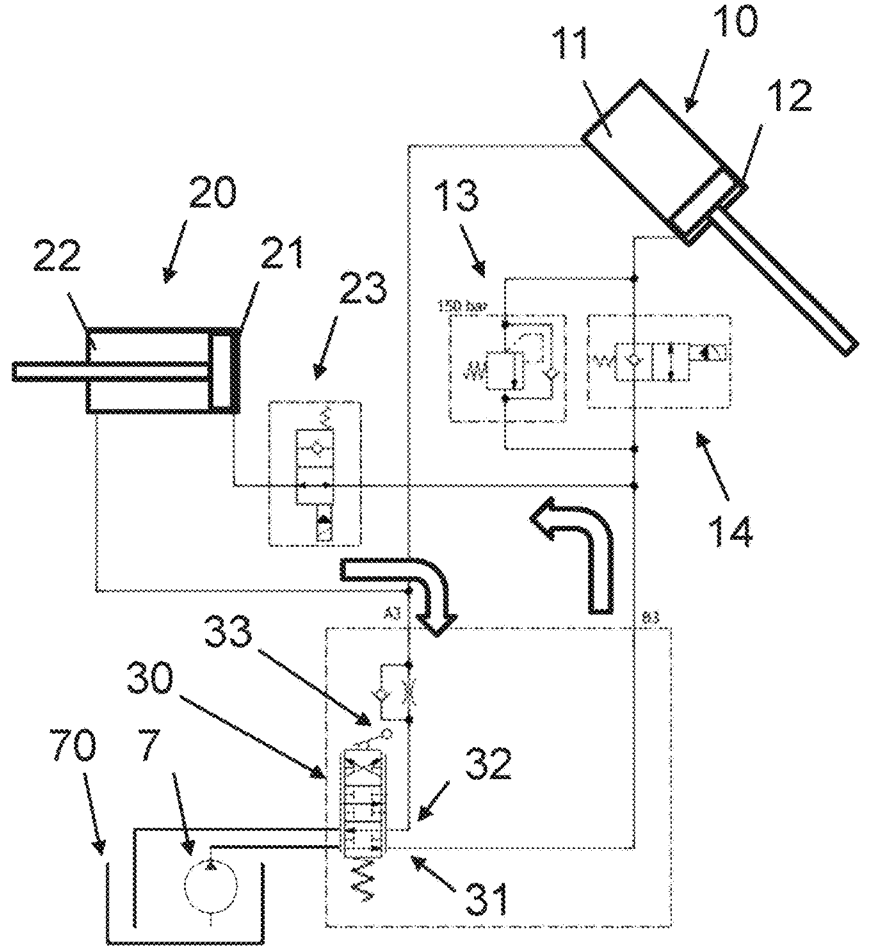

A corresponding schematic of a hydraulic system for a hydraulic sequence control is shown in FIG. 3*b*.

In an embodiment in which the mast 40 can be further tilted away from the chassis 2 past a substantially upright position, the primary actuator 10 may not have reached a substantially fully extended state in the substantially upright position of the mast 40 as shown in FIG. 3*a*. For the sake of simplicity, both the primary actor 10 and the secondary actor 20 are shown in their substantially fully retracted and extended states over the course of the depicted hydraulic sequence control.

Coming from a substantially fully retracted position of the secondary reach system 52, the first solenoid valve 23 may be switched into an open position when the secondary reach system 52 is extended to allow parallel connection to secondary tilt actuator 20. In particular, the primary hydraulic actuator 10 and the at least one secondary hydraulic actuator 20 may be connectable in parallel in at least one reach position away from the substantially fully retracted position, preferably at least in the substantially fully extended reach position.

A hydraulic sequence control of the primary tilting motion and the secondary tilting motion for picking up a load 5 may be provided as follows:

The second chamber 12 of the primary hydraulic actuator 10 and the first chamber 21 of the secondary hydraulic actuator 20 are connectable or connected in parallel with each other and a first output port 31 of the main control valve 30—for instance by moving operating element 33 in a first direction—in a fluid conducting manner for simultaneous pressurization with hydraulic fluid upon actuation of said one operating element 33.

A hydraulic sequence control of the primary tilting motion and the secondary tilting motion will be carried out based on the driving forces required to carry out the primary tilting motion and the secondary tilting motion. The secondary hydraulic actuator 20 only has to generate momentum for tilting the fork carriage 50. The primary hydraulic actuator 10, however, would have to generate a substantially larger momentum to tilt the fork carriage which is displaced both by being mounted on the mast and by the secondary reach system 52. The flow of hydraulic fluid for carrying out the secondary tilting motion is indicated by arrows in FIG. 3*b*.

Figure 4B:
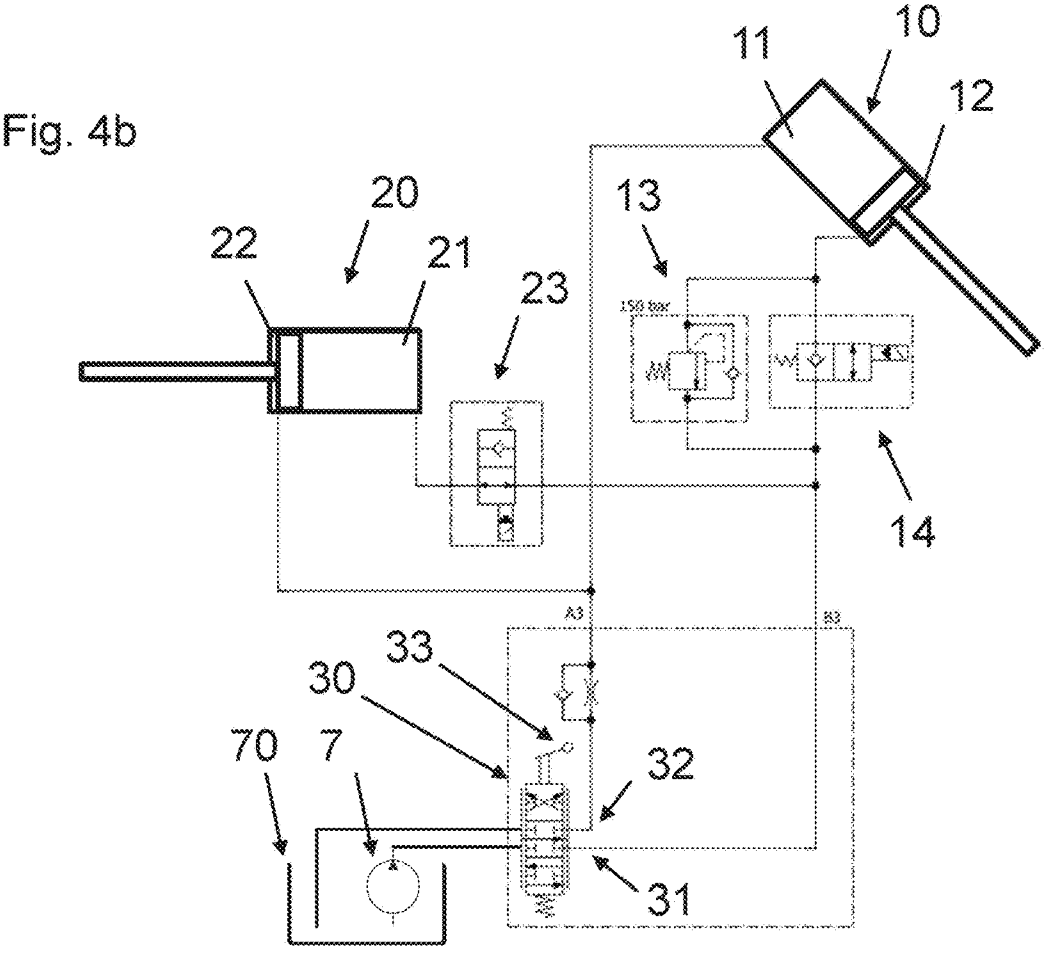

As shown in FIG. 4*a*, the secondary tilting motion is therefore prioritized or the primary tilting motion upon simultaneous pressurization with hydraulic fluid. As shown in the schematic representation of the hydraulic system in FIG. 4*b*, the secondary hydraulic actuator 20 has reached a substantially fully extended state after tilting the fork carriage 50 into the at least one inclined position. It may be noted that the truck support pads 9 remain in contact with the truck 6.

Figure 5B:
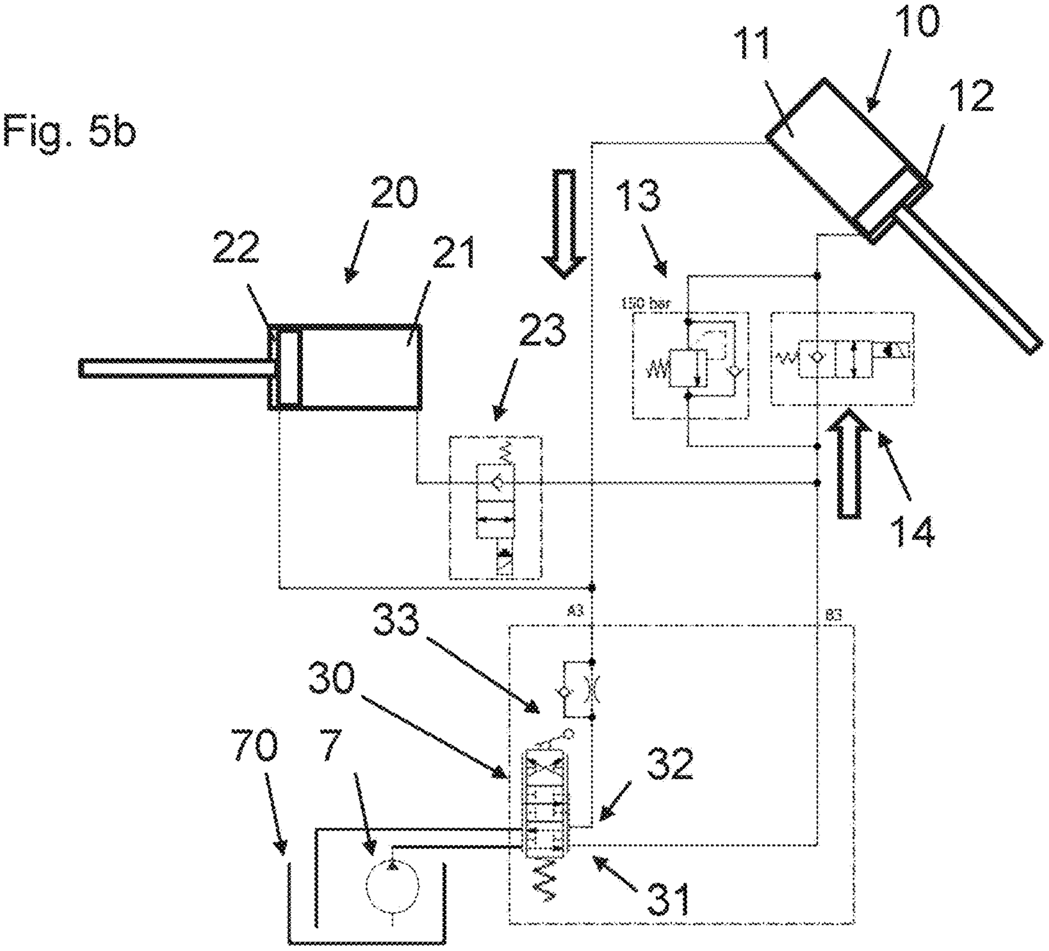

As shown in FIG. 5*a*, the secondary reach system 52 may be substantially fully retracted to remove the picked-up load 5 from truck 6. As shown in FIG. 5*b*, the at least one primary hydraulic actuator 10 and the at least one secondary hydraulic actuator 20 are disconnect from a parallel connection in at least one reach position away from the substantially fully extended position, preferably at least in the substantially fully retracted reach position.

With the first solenoid valve 23 closed, only the primary hydraulic actuator 10 may be actuated. The second chamber 12 of the primary hydraulic actuator 10 are again connected with a first output port 31 of the main control valve 30—for instance by moving operating element 33 in a first direction—in a fluid conducting manner for pressurization with hydraulic fluid upon actuation of said one operating element 33. Since the secondary reach system 52 is now substantially fully retracted, the load moment is significantly reduced allowing the primary tilting motion to operate as normal, leading to a forklift 1 with a tilted fork carriage 50 and a tilted mast 40 as shown in FIG. 6*a*. The flow of hydraulic fluid for carrying out the primary tilting motion is indicated by arrows in FIG. 5*b*.

Figure 6B:
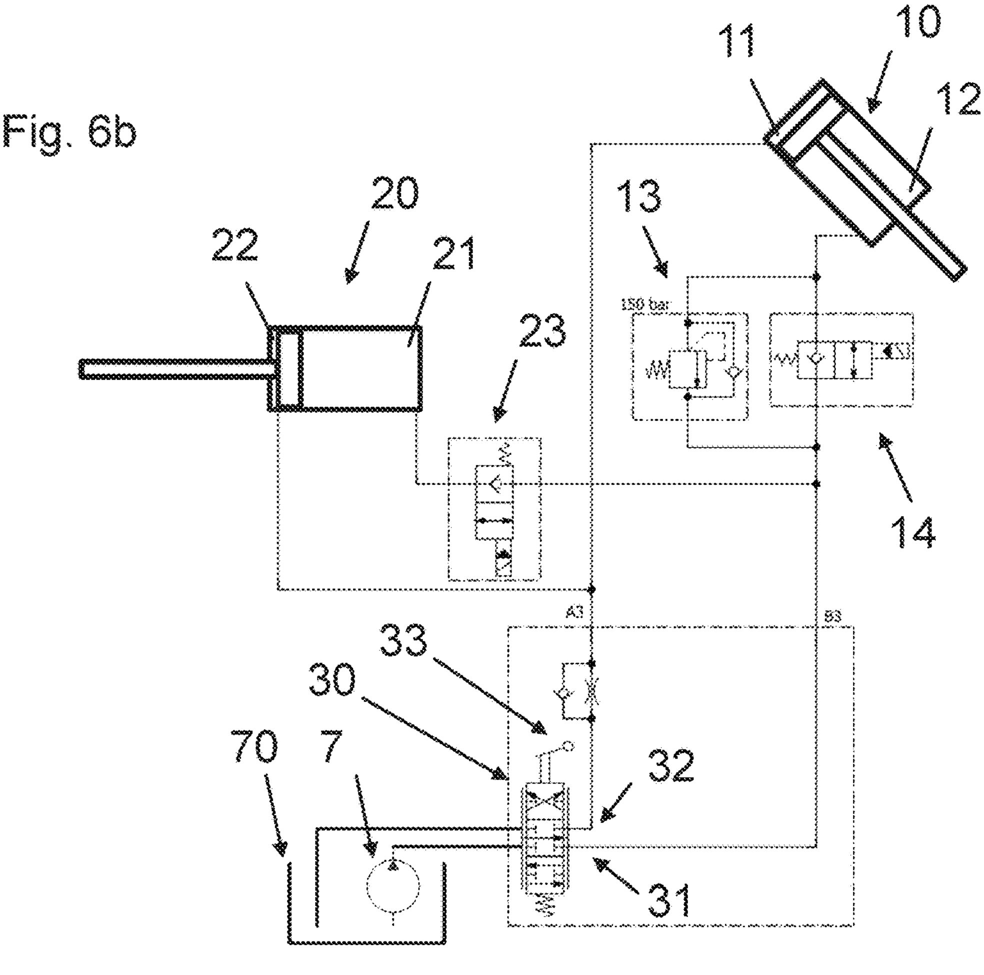

As shown in the schematic representation of the hydraulic system in FIG. 6*b*, the primary hydraulic actuator 10 has reached a substantially fully retracted state after tilting the mast 40 into the at least one inclined position.

As shown in FIG. 7*a*, the mast 40 may be retracted substantially fully back towards the chassis 2 by way of the primary reach system 41. The picked-up load 5 may be lowered by moving the fork carriage 50 down the mast 40 as shown in FIG. 8*a*.

Figure 8A:
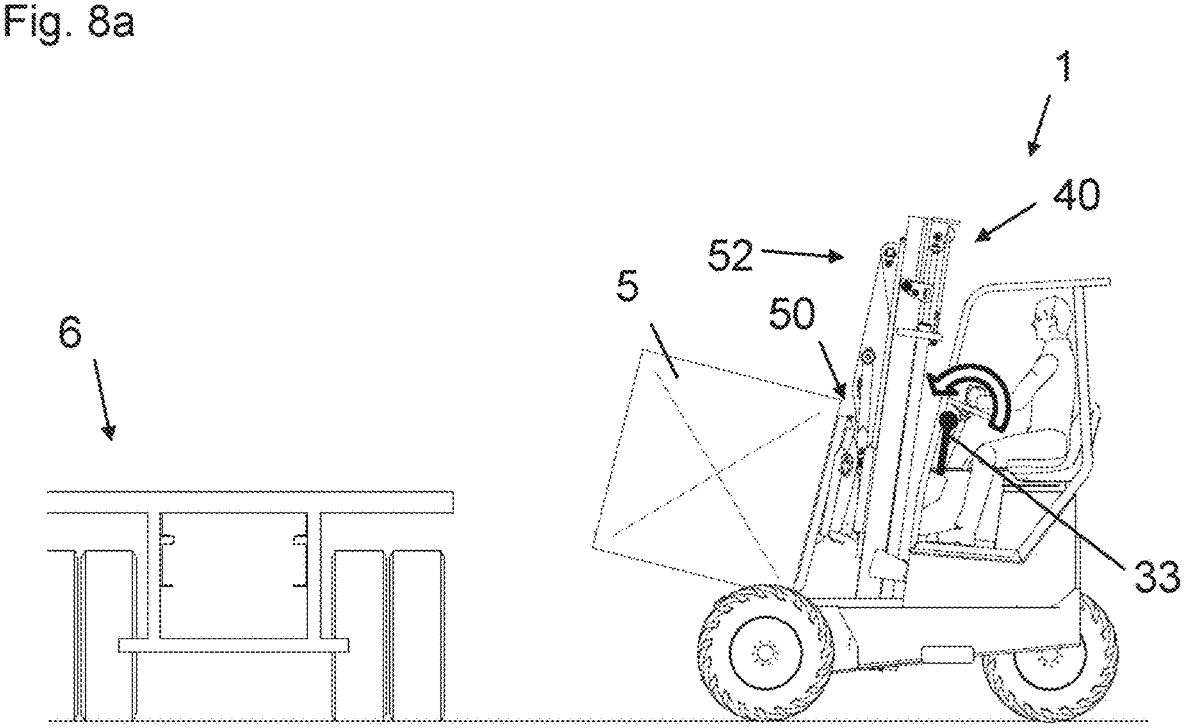
FIGS. 8*a* and 8*b* show a forklift with a lowered load and a corresponding schematic of a hydraulic system.

When the mast 40 is initially retracted as shown in FIG. 8*a* and the forklift 1 travels, the secondary tilt remains in the fully tilted back condition.

A hydraulic sequence control of the primary tilting motion and the secondary tilting motion for setting down a load 5 may be provided as follows:

The first chamber 11 of the primary hydraulic actuator 10 and the second chamber 22 of the secondary hydraulic actuator 20 are connectable or connected with each other and a second output port 32 of the main control valve 30—for instance by moving operating element 33 in a second direction—in a fluid conducting manner for simultaneous pressurization with hydraulic fluid upon actuation of said one operating element 33, wherein discharge of hydraulic fluid from the second chamber 12 of the primary hydraulic actuator 10 is hydraulically locked by a pressure relief valve 13 which enables discharge of hydraulic fluid from the second chamber 12 of the primary hydraulic actuator 10 above a predetermined or predeterminable hydraulic pressure in the second chamber 12 of the primary hydraulic actuator 10.

Figure 8B:
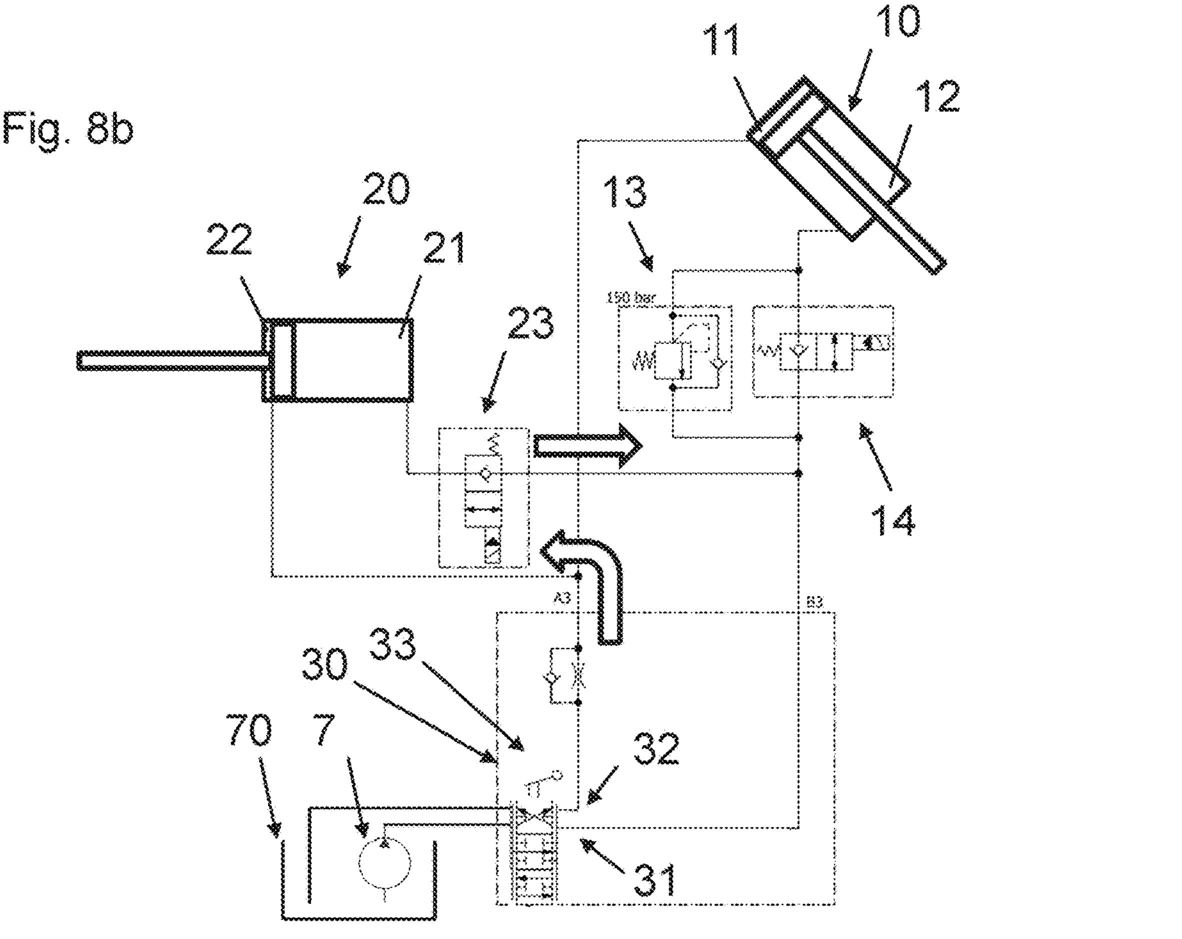

Therefore, the secondary tilting motion is carried out first by pressurization of the second chamber 22 of the secondary hydraulic actuator 20 and discharge from the first chamber 21 of the secondary hydraulic actuator 20. The flow of hydraulic fluid for carrying out the secondary tilting motion is indicated by arrows in FIG. 8*b*.

Figure 9A:
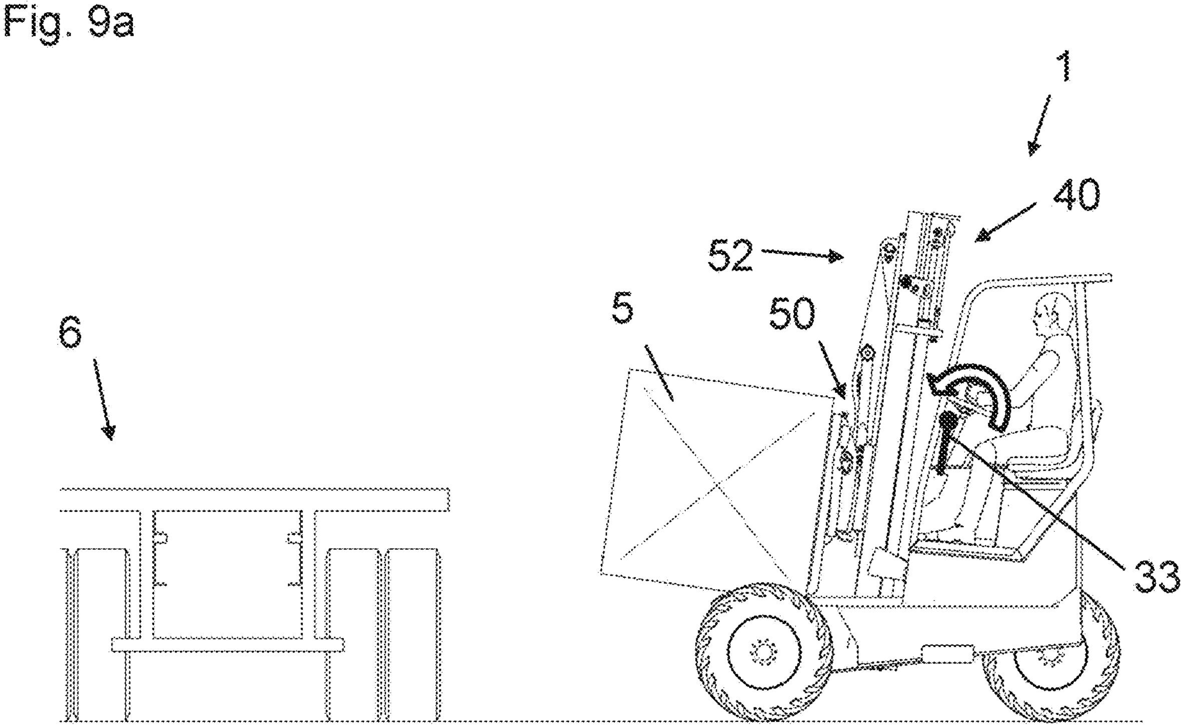
FIGS. 9*a* and 9*b* show a forklift with a fork carriage substantially aligned to a tilted mast and a corresponding schematic of a hydraulic system.
Figure 9B:
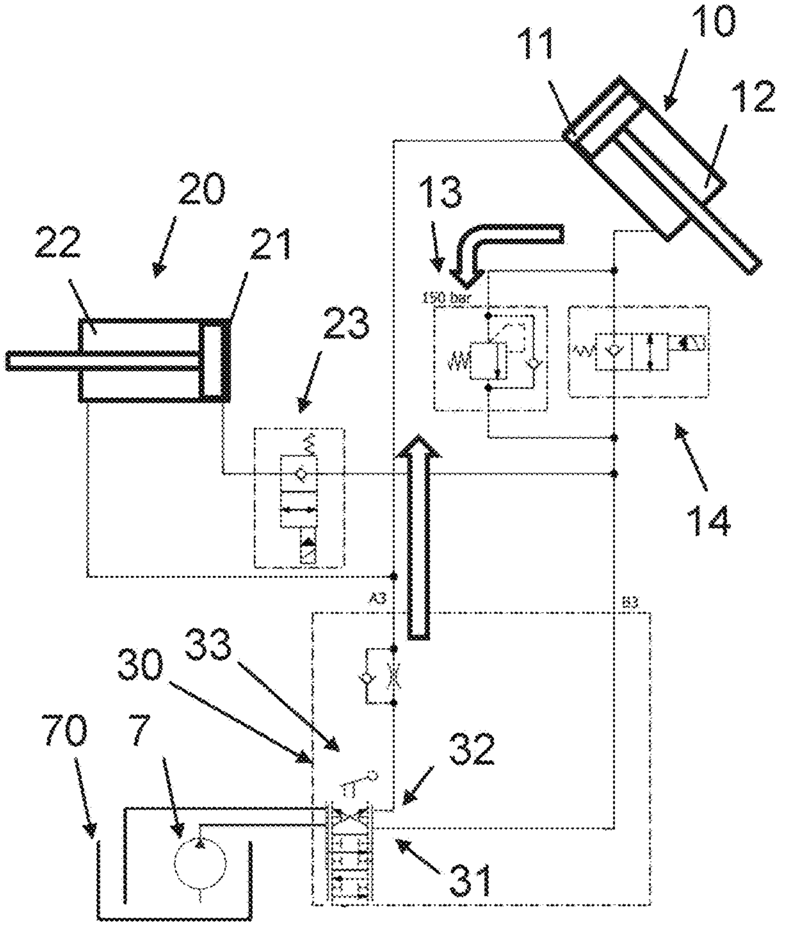

Upon reaching the position in which the fork carriage 50 is substantially aligned with the mast 40 as shown in FIG. 9*a*, the secondary hydraulic actuator 20 may reach an end stop, for instance through reaching a substantially fully retracted state as shown in FIG. 9*b*. The pressure in the first chamber 11 of the primary hydraulic actuator 10—and through force transmission in the hydraulic actuator 10 also in the second chamber 12 of the primary hydraulic actuator 10—may consequently start to increase. Above a predetermined or predeterminable hydraulic pressure, as exemplary indicated in the figures above a hydraulic pressure of 150 bar, in the second chamber 12 of the primary hydraulic actuator 10, the primary tilting motion towards the substantially upright position of the mast 40 may be carried out by enabling discharge of hydraulic fluid from the second chamber 12 of the primary hydraulic actuator 10. The flow of hydraulic fluid for carrying out the primary tilting motion is indicated by arrows in FIG. 9*b*.

Figure 10A:
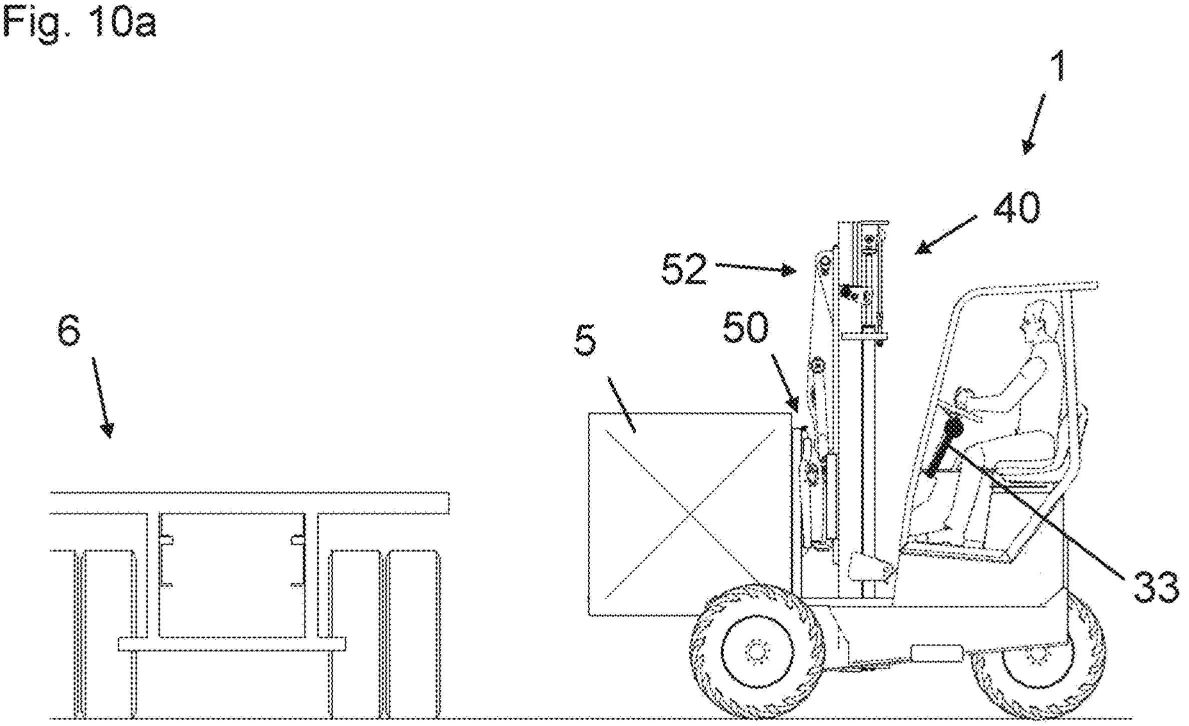
FIGS. 10*a* and 10*b* show a forklift with a fork carriage aligned to a substantially upright mast and a corresponding schematic of a hydraulic system.
Figure 10B:
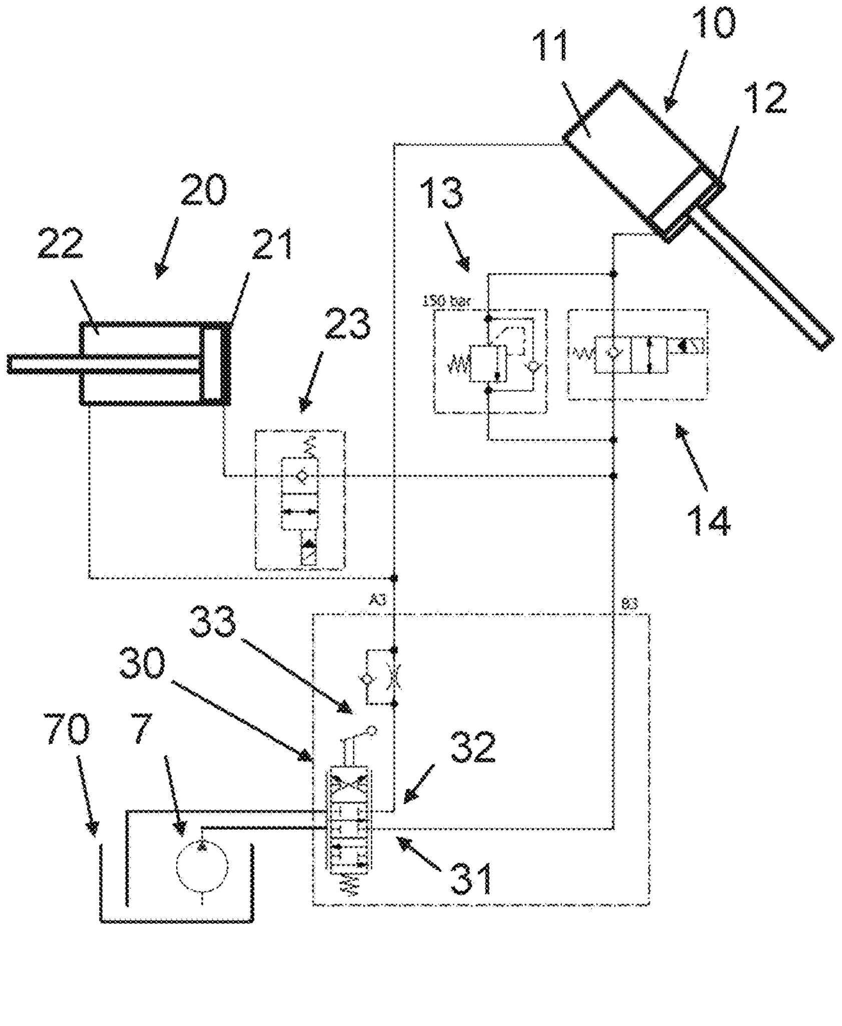

FIGS. 10*a* and 10*b* consequently show a forklift 1 with a fork carriage 50 aligned to a substantially upright mast 40 and a corresponding schematic of a hydraulic system, with the primary hydraulic actuator 10 having reached a substantially fully extended state after tilting the mast 40 into the substantially upright position. In an embodiment in which the mast 40 can be further tilted away from the chassis 2 past a substantially upright position, the primary actuator 10 may not have reached a substantially fully extended state but may still have some travel left.

An advantage of the hydraulic tilt sequence may also be seen in the fact that priority is automatically given to the secondary tilting motion tilting towards the substantially aligned position. Once in the substantially aligned position, the secondary tilting motion may not be carried again until the secondary reach system is extended. This ensures that the fork carriage 50 is always in the substantially aligned position when approaching a truck 5 to pick the next load 6.

Figure 11A:
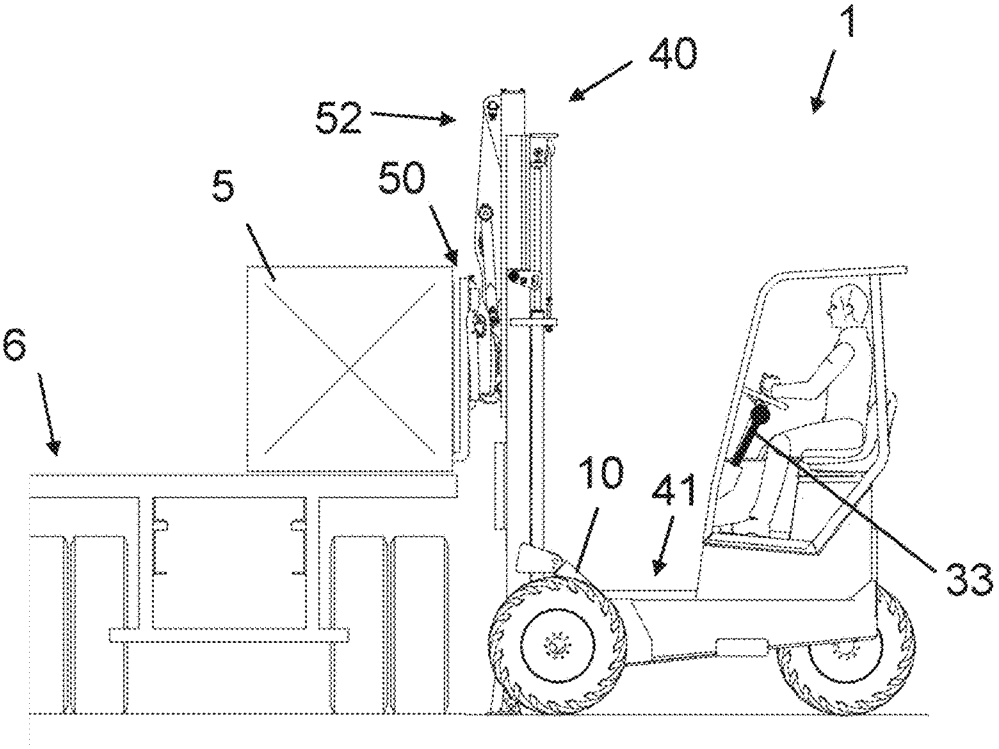
FIGS. 11*a* and 11*b* show a forklift with a picked-up load with a fully extended primary reach system and a corresponding schematic of a hydraulic system.
Figure 11B:
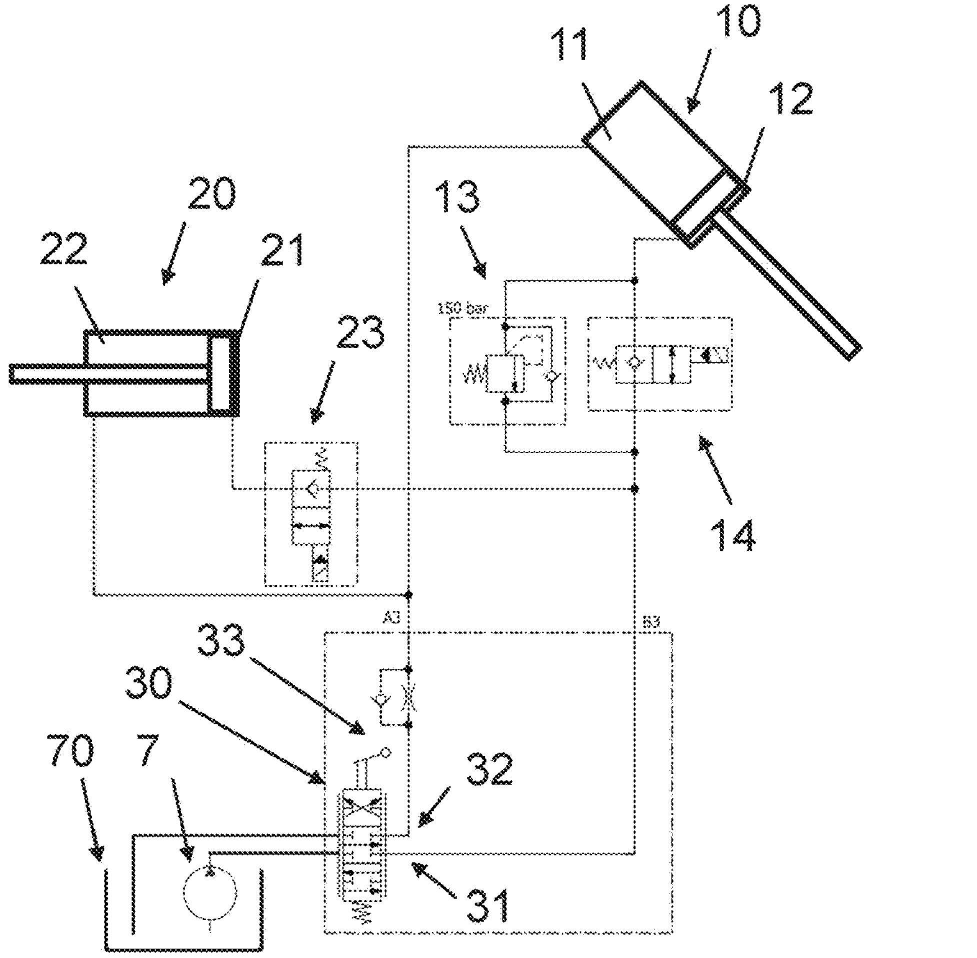

FIGS. 11*a* and 11*b* show a forklift 1 with a picked-up load 5 with a fully extended primary reach system and a corresponding schematic of a hydraulic system. The secondary reach system 52 is not being used and is therefore substantially fully retracted. The first solenoid valve 23 is in a closed position in which the first chamber 21 of the secondary hydraulic actuator 20 may not be pressurized with hydraulic fluid, the secondary tilting motion is therefore not accessible. The primary tilting motion remains accessible through pressurization of the first or second chamber 11, 12 of the primary hydraulic actuator 10.

LIST OF REFERENCE NUMERALS

1 forklift
2 chassis
3 wheel
4 driver's cabin
5 load
6 truck
7 hydraulic fluid source
8 hydraulic throttle
9 truck support pads
10 primary hydraulic actuator
11 first chamber primary hydraulic actuator
12 second chamber primary hydraulic actuator
13 pressure relief valve
14 second solenoid valve
20 secondary hydraulic actuator
21 first chamber secondary hydraulic actuator
22 second chamber secondary hydraulic actuator
23 first solenoid valve
30 main control valve
31 first output port
32 second output port
33 operating element
40 mast
41 primary reach system
42 pivot point
50 fork carriage
51 side-shift system
52 secondary reach system
53 pivot point
54 forks
70 tank

The invention claimed is:

1. A forklift comprising:

a chassis;

a mast hydraulically tiltable relative to the chassis in a primary tilting motion between a substantially upright position and an inclined position;

a fork carriage for mounting forks for supporting a load, the fork carriage being hydraulically tiltable relative to the mast in a secondary tilting motion between a position in which the fork carriage is substantially aligned with the mast and a position in which the fork carriage is inclined relative to the mast; and a hydraulic system having an operating element to allow a user to control the primary tilting motion and the secondary tilting motion;

wherein the hydraulic system is configured to carry out a hydraulic sequence control of the primary tilting motion and the secondary tilting motion, wherein the chassis, the mast, the fork carriage, and the hydraulic system are configured such that, for picking up a load, upon actuation of one operating element, the secondary tilting motion from the position in which the fork carriage is substantially aligned with the mast to the position in which the fork carriage is inclined relative to the mast is achieved before the primary tilting motion from the substantially upright position to the inclined position, and wherein the chassis, the mast, the fork carriage, and the hydraulic system are configured such that, for setting down a load, upon actuation of one operating element, the secondary tilting motion from the position in which the fork carriage is inclined relative to the mast to the position in which the fork carriage is substantially aligned with the mast is achieved before the primary tilting motion from the inclined position to the substantially upright position, and the primary tilting motion from the inclined position to the substantially upright position is hydraulically locked until the fork carriage is substantially aligned with the mast.

2. The forklift according to claim 1, wherein the hydraulic system comprises a single operating element for a user to control the primary tilting motion and the secondary tilting motion, wherein the single operating element is moveable in a first direction to pick up a load, and the single operating element is moveable in a second direction to set down a load.

3. The forklift according to claim 1, wherein the hydraulic system is configured to carry out a hydraulic sequence control of the primary tilting motion and the secondary tilting motion based on driving forces required to carry out the primary tilting motion and the secondary tilting motion.

4. The forklift according to claim 1, wherein the hydraulic system comprises:

a hydraulic fluid source for supplying pressurized hydraulic fluid;

a primary hydraulic actuator for driving the primary tilting motion with pressurized hydraulic fluid; and a secondary hydraulic actuator for driving the secondary tilting motion with pressurized hydraulic fluid;

wherein to drive the primary tilting motion and the secondary tilting motion, the primary hydraulic actuator and the secondary hydraulic actuator are simultaneously pressurizable with hydraulic fluid from the hydraulic fluid source upon actuation of the operating element.

5. The forklift according to claim 1, wherein the hydraulic system comprises:

a hydraulic fluid source for supplying pressurized hydraulic fluid;

a primary hydraulic actuator for driving the primary tilting motion;

a secondary hydraulic actuator for driving the secondary tilting motion;

wherein to pick up a load, the primary hydraulic actuator and the secondary hydraulic actuator are connectable or connected in parallel for simultaneous pressurization with hydraulic fluid for driving the primary tilting motion of the mast from the substantially upright position to the inclined position and the secondary tilting motion of the fork carriage from the position in which the fork carriage is substantially aligned with the mast to the position in which the fork carriage is inclined relative to the mast, and/or wherein to set down a load, the primary hydraulic actuator and the secondary hydraulic actuator are connectable or connected in parallel for simultaneous pressurization with hydraulic fluid for driving the primary tilting motion of the mast from the inclined position to the substantially upright position and the secondary tilting motion of the fork carriage from a position in which the fork carriage is inclined relative to the mast to the position in which the fork carriage is substantially aligned with the mast.

6. The forklift according to claim 1, wherein the hydraulic system comprises:

a hydraulic fluid source for selectively supplying pressurized hydraulic fluid through a main control valve operable by the operating element;

a primary tilt system configured to tilt the mast in the primary tilting motion, wherein the primary tilt system comprises a primary hydraulic actuator for driving the primary tilting motion, the primary hydraulic actuator is a double acting hydraulic cylinder with a first chamber and a second chamber, and the primary tilting motion towards the inclined position is driven by pressurizing the second chamber of the primary hydraulic actuator with hydraulic fluid and the primary tilting motion towards the substantially upright position is driven by pressurizing the first chamber of the primary hydraulic actuator with hydraulic fluid; and a secondary tilt system configured to tilt the fork carriage relative to the mast in the secondary tilting motion, the secondary tilt system comprises a secondary hydraulic actuator for driving the secondary tilting motion, the secondary hydraulic actuator is a double acting hydraulic cylinder with a first chamber and a second chamber, the secondary tilting motion towards the position in which the fork carriage is inclined relative to the mast is driven by pressurizing the first chamber of the secondary hydraulic actuator with hydraulic fluid and the secondary tilting motion towards the position in which the fork carriage is substantially aligned with the mast is driven by pressurizing the second chamber of the secondary hydraulic actuator with hydraulic fluid;

wherein to perform a hydraulic sequence control of the primary tilting motion and the secondary tilting motion for picking up a load:

the second chamber of the primary hydraulic actuator and the first chamber of the secondary hydraulic actuator are connectable or connected in parallel with each other and a first output port of the main control valve in a fluid conducting manner for simultaneous pressurization with hydraulic fluid upon actuation of said one operating element, and/or wherein to perform a hydraulic sequence control of the primary tilting motion and the secondary tilting motion for setting down a load:

the first chamber of the primary hydraulic actuator and the second chamber of the secondary hydraulic actuator are connectable or connected with each other and a second output port of the main control valve in a fluid conducting manner for simultaneous pressurization with hydraulic fluid upon actuation of the operating element, and discharge of hydraulic fluid from the second chamber of the primary hydraulic actuator is hydraulically locked by a pressure relief valve to enable discharge of hydraulic fluid from the second chamber of the primary hydraulic actuator above a predetermined or predeterminable hydraulic pressure in the second chamber of the primary hydraulic actuator.

7. The forklift according to claim 1, wherein:

in a primary tilting motion of the mast relative to the chassis in a direction of tilting the mast towards the inclined position, a vertical position of the fork carriage relative to the chassis is elevated, and in a secondary tilting motion of the fork carriage relative to the mast in a direction of tilting the fork carriage towards the position in which the fork carriage is inclined relative to the mast, a vertical position of the fork carriage relative to the mast is elevated.

8. The forklift according to claim 5, wherein the fork carriage is mounted to the mast by a reach system, and the fork carriage is displaceable in a substantially horizontal direction relative to the mast by the reach system, the primary hydraulic actuator and the secondary hydraulic actuator are connectable in parallel or disconnectable from a parallel connection depending on a substantially horizontal displacement of the fork carriage relative to the mast.

9. The forklift according to claim 8, wherein the primary hydraulic actuator and the secondary hydraulic actuator are connectable in parallel or disconnectable from a parallel connection based on a switching state of a proximity switch and/or a signal from a position sensor.

10. The forklift according to claim 8, wherein:

the primary hydraulic actuator and the secondary hydraulic actuator are connectable in parallel in a reach position away from the substantially fully retracted position, and/or the primary hydraulic actuator and the secondary hydraulic actuator are disconnectable from a parallel connection in a reach position away from the substantially fully extended position.

11. The forklift according to claim 1, wherein in the primary tilting motion, the mast is tiltable in a direction towards and away from the chassis in a substantially vertical plane, and in the secondary tilting motion, the fork carriage is tiltable in a direction towards and away from the mast in a substantially vertical plane.

12. The forklift according to claim 1, wherein the mast is mounted to the chassis by a reach system, and the mast is displaceable in a substantially horizontal direction relative to the chassis by the reach system.

13. The forklift according to claim 1, wherein the fork carriage is mounted to the mast with a side-shift system for laterally shifting the fork carriage relative to the mast, and the fork carriage is tiltable in the secondary tilting motion relative to the side- shift system.

14. The forklift according to claim 1, wherein the forklift is a truck mountable forklift.

15. The forklift according to claim 8, wherein the fork carriage is mounted to the mast by a secondary reach system.

16. The forklift according to claim 10, wherein:

the primary hydraulic actuator and the secondary hydraulic actuator are connectable in parallel in the reach position away from the substantially fully retracted position in the substantially fully extended reach position, and/or the primary hydraulic actuator and the secondary hydraulic actuator are disconnectable from a parallel connection in the reach position away from the substantially fully extended position in the substantially fully retracted reach position.

17. The forklift according to claim 12, wherein the mast is mounted to the chassis by a primary reach system.

* * * * *